United States Patent
Uhm et al.

(10) Patent No.: US 9,735,402 B2
(45) Date of Patent: Aug. 15, 2017

(54) BATTERY CELL HAVING DOUBLE SEALING STRUCTURE

(71) Applicant: LG Chem, Ltd., Seoul (KR)

(72) Inventors: InSung Uhm, Daejeon (KR); Je Young Kim, Daejeon (KR); Seunghyun Chung, Daejeon (KR)

(73) Assignee: LG Chem, Ltd. (KR)

( * ) Notice: Subject to any disclaimer, the term of this patent is extended or adjusted under 35 U.S.C. 154(b) by 337 days.

(21) Appl. No.: 14/330,114

(22) Filed: Jul. 14, 2014

(65) Prior Publication Data
US 2015/0037663 A1  Feb. 5, 2015

(30) Foreign Application Priority Data

Jul. 30, 2013 (KR) ......................... 10-2013-0089927

(51) Int. Cl.
| | |
|---|---|
| *H01M 2/08* | (2006.01) |
| *H01M 2/02* | (2006.01) |
| *H01M 10/0525* | (2010.01) |
| *H01M 10/34* | (2006.01) |
| *H01M 2/10* | (2006.01) |
| *H01M 2/14* | (2006.01) |
| *H01M 4/131* | (2010.01) |
| *H01M 4/1315* | (2010.01) |

(Continued)

(52) U.S. Cl.
CPC .......... *H01M 2/08* (2013.01); *H01M 2/0287* (2013.01); *H01M 10/0525* (2013.01); *H01M 10/34* (2013.01); *H01M 2/1094* (2013.01); *H01M 2/14* (2013.01); *H01M 4/131* (2013.01); *H01M 4/1315* (2013.01); *H01M 4/485* (2013.01); *H01M 4/505* (2013.01); *H01M 4/525* (2013.01); *H01M 4/58* (2013.01); *H01M 4/5825* (2013.01); *H01M 4/628* (2013.01); *H01M 2220/10* (2013.01); *H01M 2220/20* (2013.01); *Y02E 60/122* (2013.01); *Y02T 10/7011* (2013.01)

(58) Field of Classification Search
CPC .............................. H01M 2/1094; H01M 2/14
See application file for complete search history.

(56) References Cited

U.S. PATENT DOCUMENTS

| | | | |
|---|---|---|---|
| 2002/0022180 A1* | 2/2002 | Olsen | .................. H01M 2/0212 429/176 |
| 2007/0099090 A1* | 5/2007 | Oh | ..................... H01M 10/0565 429/339 |

(Continued)

FOREIGN PATENT DOCUMENTS

| | | | |
|---|---|---|---|
| JP | 2009076248 A | * | 4/2009 |
| JP | 4657383 B2 | | 3/2011 |
| KR | 20100118394 A | | 11/2010 |

OTHER PUBLICATIONS

JP2009076248trans.*

*Primary Examiner* — Sarah A Slifka
*Assistant Examiner* — Brian Ohara
(74) *Attorney, Agent, or Firm* — Lerner, David, Littenberg & Krumholz & Mentlik, LLP

(57) ABSTRACT

Disclosed is a battery cell having a double sealing structure. In particular, the battery cell includes a first sealing portion formed at an outer circumferential surface of a battery case by thermal bonding and a second sealing portion further formed between an electrode assembly and the first sealing portion at at least one side surface of the first sealing portion.

15 Claims, 2 Drawing Sheets

(51) Int. Cl.
*H01M 4/485* (2010.01)
*H01M 4/505* (2010.01)
*H01M 4/525* (2010.01)
*H01M 4/58* (2010.01)
*H01M 4/62* (2006.01)

(56) References Cited

U.S. PATENT DOCUMENTS

| | | | | |
|---|---|---|---|---|
| 2007/0202393 A1* | 8/2007 | Hu | ...................... | H01M 2/0469 |
| | | | | 429/53 |
| 2010/0028772 A1* | 2/2010 | Yang | ..................... | H01M 2/021 |
| | | | | 429/185 |
| 2010/0291423 A1* | 11/2010 | Hideo | ................. | H01M 2/0212 |
| | | | | 429/82 |
| 2013/0143107 A1* | 6/2013 | Kuramoto | ........... | H01M 2/0287 |
| | | | | 429/163 |

\* cited by examiner

BATTERY CELL HAVING DOUBLE SEALING STRUCTURE

CROSS-REFERENCE TO RELATED APPLICATIONS

The present application claims priority from Korean Patent Application No. 10-2013-0089927 filed Jul. 30, 2013, the disclosure of which is hereby incorporated herein by reference.

TECHNICAL FIELD

The present invention relates to a battery cell having a double sealing structure.

BACKGROUND ART

As mobile device technology continues to develop and demand therefor continues to increase, demand for secondary batteries as energy sources is rapidly increasing. Among these secondary batteries, lithium secondary batteries, which exhibit high energy density and voltage, long cycle lifespan, and low self-discharge rate, are commercially available and widely used.

In general, secondary batteries have a structure in which an electrode assembly including a cathode, an anode, and a separator disposed therebetween is accommodated in a stacked or wound form in a battery case made of a metal can or a laminate sheet and an electrolyte is injected thereinto or the electrode assembly is impregnated with an electrolyte.

Among these secondary batteries, in a pouch-type secondary battery consisting of a high-voltage battery cell, one of the main research tasks is to prevent deterioration of battery performance due to generation of gas when a battery is subjected to activation and in use. For example, when a secondary battery is activated, a large amount of gas is generated, which increases the volume of the battery or damages a sealing portion of a battery case and, consequently, the generated gas leaks outside. Thus, an electrolyte leaks via the damaged sealing portion and, accordingly, battery performance is deteriorated.

In addition, even when gas is generated by decomposition of an electrolyte at an electrode due to abnormal battery operating conditions such as an overcharge state in which current and voltage when a battery is in use are higher than allowable current and voltage, exposure to high temperature, and the like, batteries are damaged due to the reason described above.

In addition, in secondary batteries, an electrolyte may be depleted due to leakage thereof due to damage to a sealing portion of a battery case, oxidation thereof, or the like and, accordingly, battery lifespan is dramatically reduced.

In addition, when conventional pouch-type batteries are manufactured, excess electrolyte is injected to guard against depletion of an electrolyte and thus a skin-tight structure of a pouch-type battery is not maintained and resistance is increased due to separation of an interface between stack cells, which results in reduction in battery lifespan.

Therefore, there is an urgent need to develop a novel battery cell that addresses the problems described above.

DISCLOSURE

Technical Problem

Therefore, the present invention has been made to solve the above problems and other technical problems that have yet to be resolved.

As a result of a variety of intensive studies and various experiments, the inventors of the present invention confirmed that, as described below, when a first sealing portion is formed at an outer circumferential surface of a battery case by thermal bonding and a second sealing portion is further formed between an electrode assembly and the first sealing portion at at least one side surface of the first sealing portion, desired effects may be achieved, thus completing the present invention.

Technical Solution

In accordance with one aspect of the present invention, provided is a battery cell in which an electrode assembly is accommodated in a state of being connected to electrode terminals protruding from the battery case, the battery cell including a first sealing portion formed at an outer circumferential surface of the battery case by thermal bonding and a second sealing portion further formed between the electrode assembly and the first sealing portion at at least one side surface of the first sealing portion.

That is, the battery cell according to the present invention further includes the second sealing portion between the electrode assembly and the first sealing portion at at least one side surface of the first sealing portion and thus leakage of gas, generated when the battery cell is subjected to activation or in use, and leakage of electrolyte from the battery cell are prevented and, accordingly, battery safety may be enhanced.

In a specific embodiment, the second sealing portion may be formed at a surface at which the electrode terminals are not positioned.

In addition, the second sealing portion may be formed at a surface to which greatest internal pressure is applied.

In a specific embodiment, a space may be formed between the first and second sealing portions, and the space may have a volume of 5% to 50% based on a total volume of the inside of the battery cell.

The space may be an empty space so as to be used as a buffer space of generated gas and may prevent leakage of electrolyte from the battery case by preventing damage to the first sealing portion of the battery case due to generation of gas.

In a specific embodiment, an electrolyte may be included in the space, in particular, in an amount of 5% to 50% based on a total volume of the space.

When extra electrolyte is included between the first and second sealing portions, the extra electrolyte is introduced into the battery cell via the second sealing portion damaged by gas generated due to oxidation of the electrolyte and, accordingly, lifespan of the battery cell may be extended.

In a specific embodiment, the second sealing portion may have a lower sealing strength than the first sealing portion. In particular, the second sealing portion may have a sealing strength of 1.0 kg/cm$^2$ to 1.9 kg/cm$^2$, and the first sealing portion may have a sealing strength of 2.0 kg/cm$^2$ to 4.5 kg/cm$^2$.

That is, in the battery cell according to the present invention, due to a structure in which the sealing strength of the second sealing portion is lower than that of the first sealing portion, the second sealing portion is ruptured due to gas generated inside the battery cell before the first sealing portion. In addition, the second sealing portion may have a smaller area than the first sealing portion. Thus, the second sealing portion is ruptured by relatively small internal pressure before the first sealing portion.

In a specific embodiment, the electrode assembly may include a cathode, an anode, and a separator disposed therebetween.

In a specific embodiment, the anode may include, as an anode active material, a carbon-based material and/or Si.

The cathode may include, as a cathode active material, a lithium transition metal oxide represented by Formula 1 or 2 below:

$$Li_xM_yMn_{2-y}O_{4-z}A_z \quad (1)$$

wherein M is at least one element selected from the group consisting of Al, Mg, Ni, Co, Fe, Cr, V, Ti, Cu, B, Ca, Zn, Zr, Nb, Mo, Sr, Sb, W, Ti, and Bi;

A is at least one monovalent or divalent anion; and $$0.9 \le x \le 1.2, \ 0 < y < 2, \text{ and } 0 \le z < 0.2,$$

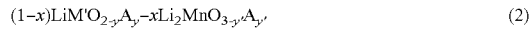

$$(1-x)LiM'O_{2-y}A_{y}-xLi_2MnO_{3-y'}A_{y'} \quad (2)$$

wherein M' is $Mn_aM_b$;

M is at least one selected from the group consisting of Ni, Ti, Co, Al, Cu, Fe, Mg, B, Cr, Zr, Zn, and Period 2 transition metals;

A is at least one selected from the group consisting of anions such as $PO_4$, $BO_3$, $CO_3$, F, and $NO_3$; and $$0 < x < 1, \ 0 < y \le 0.02, \ 0 < y' \le 0.02, \ 0.5 \le a \le 1.0, \ 0 \le b \le 0.5,$$
$$\text{and } a+b=1.$$

The present invention also provides a battery cell in which an electrode assembly including an anode including the anode active material, a cathode including the cathode active material further including at least one of a lithium metal oxide or a lithium metal phosphorus oxide, and a separator disposed between the anode and the cathode is impregnated with an electrolyte.

The cathode is manufactured by coating a mixture of the cathode active material, a conductive material, and a binder onto a cathode current collector and drying the coated cathode current collector. As desired, the mixture may further include a filler.

The lithium metal oxide of the cathode may be $LiMO_2$ where M=Co, Ni, or Mn, $Li_{1+x}Mn_{2-x}O_{4+}$ where $0 \le x \le 0.3$, or $LiNi_{1-x}M_xO_2$ where M=Co, Mn, Al, Cu, Fe, Mg, B, or Ga and $0.01 \le x \le 0.3$. The lithium metal phosphorus oxide may be $LiMPO_4$ where M=Fe, Co, Ni, or Mn, or the like. In particular, the lithium metal oxide of the cathode may be $LiCoO_2$, $LiNiO_2$, $LiMn_2O_4$, $Li(Ni_aMn_bCo_c)O_2$ where a+b+c=1, $LiNi_{0.5}Mn_{1.5}O_4$, or $LiNi_{0.5}Mn_{0.5}O_2$, and the lithium metal phosphorus oxide may be $LiFePO_4$, $LiMnPO_4$, $Li_3V_2(PO_4)_3$, or the like, but embodiments of the present invention are not limited to the above examples. More particularly, among the above-listed oxides, $LiNi_{0.5}Mn_{1.5}O_4$, $LiCoPO_4$, $yLi_2MnO_3 \cdot (1-y)LiNi_aMn_bCo_cO_2$ where $0.2 \le y \le 0.8$ and a+b+c=1, and $Li_3V_2(PO_4)_3$, which are operable at a voltage of 4.5 V or higher, may be used.

The conductive material is generally added in an amount of 1 to 30 wt % based on a total weight of the mixture including the cathode active material. The conductive material is not particularly limited so long as it has suitable conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 30 wt % based on the total weight of the mixture including the cathode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode according to the present invention may be manufactured by coating, on a cathode current collector, a slurry prepared by mixing a cathode mixture including the compounds as described above with a solvent such as NMP or the like and drying and pressing the coated cathode current collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a battery cell including the cathode, an anode, a separator, and a lithium salt-containing non-aqueous electrolyte.

The anode is manufactured by, for example, coating an anode mixture including the anode active material onto an anode current collector and drying the coated anode current collector. As desired, the anode mixture may include the components as described above. In addition, the anode may operate at a voltage of 0 V to 3.5 V with respect to lithium.

The anode current collector is typically fabricated to a thickness of 3 to 500 μm. The anode current collector is not particularly limited so long as it does not cause chemical changes in the fabricated secondary battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include, but are not limited to, aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, without being limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

In a specific embodiment, the battery cell may be a lithium ion battery, a lithium ion polymer battery, or a lithium polymer battery.

The present invention also provides a battery module including the battery cell as a unit cell, a battery pack including the battery module, and a device including the battery pack as a power source.

For example, the device may be an electric vehicle, a hybrid electric vehicle, a plug-in hybrid electric vehicle, or a system for storing power.

Structures and manufacturing methods of such devices are known in the art and a detailed description thereof will thus be omitted herein.

Effects of the Invention

As described above, in a battery cell according to the present invention, a first sealing portion is formed at an outer circumferential surface of a battery case by thermal bonding and a second sealing portion is further formed between an electrode assembly and the first sealing portion at at least one side surface of the first sealing portion. Accordingly, reduction in lifespan of the battery cell due to loss of an electrolyte may be prevented and leakage of gas and an electrolyte from the battery cell may be prevented, which results in enhanced safety of the battery cell.

BRIEF DESCRIPTION OF THE DRAWINGS

The above and other objects, features and other advantages of the present invention will be more clearly understood from the following detailed description taken in conjunction with the accompanying drawing, in which.

BEST MODE

Now, the present invention will be described in more detail with reference to the following examples. These examples are provided only for illustration of the present invention and should not be construed as limiting the scope and spirit of the present invention.

Figure 1:
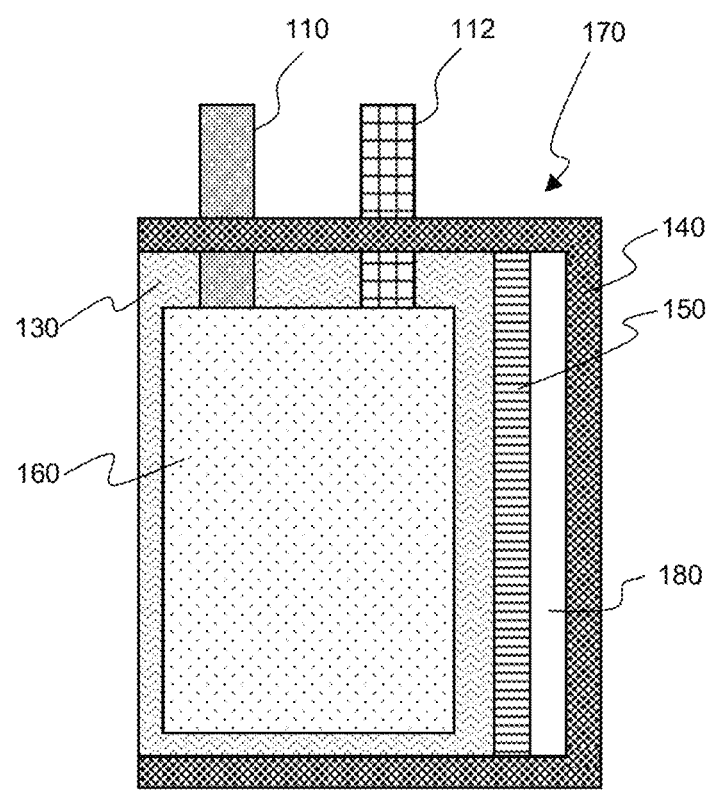
FIG. 1 is a view of a battery cell A including first and second sealing portions according to an embodiment of the present invention.

FIG. 1 is a view of a battery cell A 100 including first and second sealing portions according to an embodiment of the present invention.

Referring to FIG. 1, an electrode assembly 160 is accommodated in the battery cell A 100 of a pouch type in a state of being connected to electrode terminals 110 and 112 protruding from a battery case 170, a first sealing portion 140 is formed at an outer circumferential surface of the battery case 170 by thermal bonding, and a second sealing portion 150 is further formed between the electrode assembly 160 and the first sealing portion 140 at at least one side surface of the first sealing portion 140.

The second sealing portion 150 is formed at a surface at which the electrode terminals 110 and 112 are not positioned, and a space 180 is formed between the first sealing portion 140 and the second sealing portion 150. The space 180 includes extra electrolyte to prevent reduction in lifespan of the battery cell A 100 due to loss of an electrolyte or is formed as an empty space so as to induce gas leaked via a damaged portion of the second sealing portion 150 to move to the space 180 so that leakage of gas from the battery cell A 100 is prevented.

Thus, the second sealing portion 150 has a lower sealing strength than the first sealing portion 140.

Figure 2:
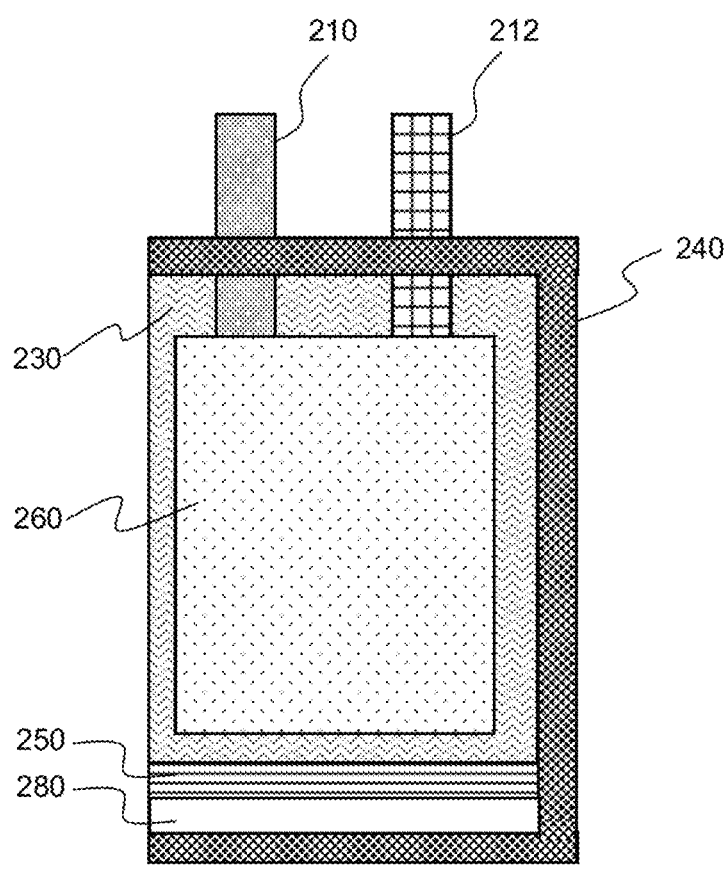
FIG. 2 is a view of a battery cell B including first and second sealing portions according to another embodiment of the present invention.

FIG. 2 is a view of a battery cell B 200 including first and second sealing portions 240 and 250 according to another embodiment of the present invention.

Referring to FIG. 2, the second sealing portion 250 is formed at a lower portion of the battery cell B 200 to which great internal pressure is applied. A space 280 is formed between the first and second sealing portions 240 and 250. Similar to the space 180, the space 280 includes extra electrolyte to prevent reduction in lifespan of the battery cell B 200 due to loss of electrolyte or is formed as an empty space so as to induce gas leaked via a damaged portion of the second sealing portion 250 to move to the space 280 so that leakage of gas from the battery cell B 200 is prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell in which an electrode assembly with a first electrolyte therein is accommodated in a state of being connected to electrode terminals protruding from a battery case, the battery cell comprising a first sealing portion formed at an outer circumferential surface of the battery case by thermal bonding and a second sealing portion further formed between the electrode assembly and the first sealing portion at at least one side surface of the first sealing portion,
wherein a space is formed between the first sealing portion and the second sealing portion and opposite to the electrode assembly, wherein the electrode assembly is not accommodated in said space,
wherein the space has a volume of 5% to 50% based on a total volume of an inside of the battery cell,
wherein second electrolyte is included in the space for being introduced into the battery cell via the second sealing portion when the second sealing portion is damaged by gas generated, and
wherein the second sealing portion has a lower sealing strength than the first sealing portion.

2. The battery cell according to claim 1, wherein the second sealing portion is formed at a surface at which the electrode terminals are not positioned.

3. The battery cell according to claim 1, wherein the second sealing portion is formed at a surface to which greatest internal pressure is applied.

4. The battery cell according to claim 1, wherein the second electrolyte is included in an amount of 5% to 50% based on a total volume of the space.

5. The battery cell according to claim 1, wherein the second sealing portion has a sealing strength of 1.0 kg/cm$^2$ to 1.9 kg/cm$^2$.

6. The battery cell according to claim 1, wherein the first sealing portion has a sealing strength of 2.0 kg/cm$^2$ to 4.5 kg/cm$^2$.

7. The battery cell according to claim 1, wherein the second sealing portion has a lower area than the first sealing portion.

8. The battery cell according to claim 1, wherein the electrode assembly comprises a cathode, an anode, and a separator disposed between the cathode and the anode.

9. The battery cell according to claim 8, wherein the cathode comprises a lithium transition metal oxide represented by Formula 1 or 2 below as a cathode active material:

$$Li_xM_yMn_{2-y}O_{4-z}A_z \qquad (1)$$

wherein M is at least one element selected from the group consisting of Al, Mg, Ni, Co, Fe, Cr, V, Ti, Cu, B, Ca, Zn, Zr, Nb, Mo, Sr, Sb, W, Ti, and Bi;

A is at least one monovalent or divalent anion; and $$0.9 \leq x \leq 1.2,\ 0<y<2,\ \text{and}\ 0 \leq z<0.2,$$

$$(1-x)LiM'O_{2-y}A_y\text{-}xLi_2MnO_{3-y'}A_{y'} \qquad (2)$$

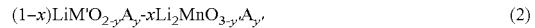

wherein M' is $Mn_aM_b$;

M is at least one selected from the group consisting of Ni, Ti, Co, Al, Cu, Fe, Mg, B, Cr, Zr, Zn, and Period 2 transition metals;

A is at least one selected from the group consisting of $PO_4$, $BO_3$, $CO_3$, F and $NO_3$ anions; and $$0<x<1,\ 0<y\leq 0.02,\ 0<y'\leq 0.02,\ 0.5\leq a\leq 1.0,\ 0\leq b\leq 0.5,$$
$$\text{and}\ a+b=1.$$

10. The battery cell according to claim 8, wherein the anode comprises a carbon-based material and/or Si as an anode active material.

11. The battery cell according to claim 1, wherein the battery cell is a lithium ion battery, a lithium ion polymer battery, or a lithium polymer battery.

12. A battery module comprising the battery cell according to claim 1 as a unit cell.

13. A battery pack comprising the battery module according to claim 12.

14. A device comprising the battery pack according to claim 13 as a power source.

15. The device according to claim 14, wherein the device is an electric vehicle, a hybrid electric vehicle, a plug-in hybrid electric vehicle, or a system for storing power.

* * * * *